(12) United States Patent
Sun et al.

(10) Patent No.: US 11,218,402 B2
(45) Date of Patent: Jan. 4, 2022

(54) BLOCKCHAIN SYSTEMS, AND MESSAGE TRANSMISSION METHODS AND APPARATUSES

(71) Applicant: ALIPAY (HANGZHOU) INFORMATION TECHNOLOGY CO., LTD., Zhejiang (CN)

(72) Inventors: He Sun, Hangzhou (CN); Chao Zeng, Hangzhou (CN); Jiang Wang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/362,929

(22) Filed: Jun. 29, 2021

(65) Prior Publication Data
US 2021/0328907 A1 Oct. 21, 2021

(30) Foreign Application Priority Data

Sep. 25, 2020 (CN) .......................... 202011019900.2

(51) Int. Cl.
*H04L 12/715* (2013.01)
*H04L 12/803* (2013.01)
*H04L 12/721* (2013.01)

(52) U.S. Cl.
CPC .............. *H04L 45/04* (2013.01); *H04L 45/12* (2013.01); *H04L 47/125* (2013.01)

(58) Field of Classification Search
None
See application file for complete search history.

(56) References Cited

U.S. PATENT DOCUMENTS

| 10,417,217 B2 | 9/2019 | Pierce et al. |
| 10,757,084 B1 | 8/2020 | Yu |
| 2014/0022902 A1 | 1/2014 | Uppunda et al. |

(Continued)

FOREIGN PATENT DOCUMENTS

| CN | 1599350 | 3/2005 |
| CN | 102769889 | 11/2012 |

(Continued)

OTHER PUBLICATIONS bitcoinfibre.org [online], "FIBRE," available no later than Jul. 2016, retrieved on Aug. 24, 2021, retrieved from URL<https://bitcoinfibre.org/>, 4 pages.

(Continued)

*Primary Examiner* — Anh Hgoc M Nguyen
(74) *Attorney, Agent, or Firm* — Fish & Richardson P.C.

(57) ABSTRACT

One or more embodiments of this specification provide a blockchain system, and a message transmission method and apparatus. The method includes: receiving a blockchain message from a blockchain node of a plurality of blockchain nodes in a blockchain relay communication network; sending the blockchain message to a relay node in a relay cluster of a plurality of relay clusters; and transmitting the blockchain message to the target blockchain node through the target relay cluster, wherein each blockchain node of the plurality of blockchain nodes is connected to at least one relay cluster of the plurality of relay clusters, and each relay cluster of the plurality of relay clusters comprises a load balancer and at least one relay node connected to the load balancer.

20 Claims, 8 Drawing Sheets

(56) References Cited

U.S. PATENT DOCUMENTS

| | | | |
|---|---|---|---|
| 2017/0352027 A1 | 12/2017 | Zhang et al. | |
| 2018/0212970 A1 | 7/2018 | Chen et al. | |
| 2018/0337847 A1 | 11/2018 | Li et al. | |
| 2019/0082007 A1 | 3/2019 | Klarman et al. | |
| 2020/0081746 A1 | 3/2020 | Fry et al. | |
| 2020/0177572 A1 | 6/2020 | Qui | |
| 2020/0313902 A1* | 10/2020 | Yu | G06F 21/71 |
| 2020/0403899 A1* | 12/2020 | Bartolucci | H04L 45/02 |
| 2021/0264051 A1* | 8/2021 | Koide | G06F 21/6227 |

FOREIGN PATENT DOCUMENTS

| | | |
|---|---|---|
| CN | 103533569 | 1/2014 |
| CN | 103916423 | 7/2014 |
| CN | 104753980 | 7/2015 |
| CN | 105306232 | 2/2016 |
| CN | 107231299 | 10/2017 |
| CN | 107800795 | 3/2018 |
| CN | 107846718 | 3/2018 |
| CN | 108829749 | 11/2018 |
| CN | 109039847 | 12/2018 |
| CN | 109635165 | 4/2019 |
| CN | 109639550 | 4/2019 |
| CN | 109784881 | 5/2019 |
| CN | 109996306 | 7/2019 |
| CN | 110445882 | 11/2019 |
| CN | 110474846 | 11/2019 |
| CN | 110602201 | 12/2019 |
| CN | 110650189 | 1/2020 |
| CN | 110737664 | 1/2020 |
| CN | 110741400 | 1/2020 |
| CN | 110751475 | 2/2020 |
| CN | 111066286 | 4/2020 |
| CN | 111132258 | 5/2020 |
| CN | 111245745 | 6/2020 |
| CN | 111277549 | 6/2020 |
| CN | 111277562 | 6/2020 |
| CN | 111353175 | 6/2020 |
| CN | 111447290 | 7/2020 |
| CN | 111522833 | 8/2020 |
| KR | 20180129028 | 12/2018 |

OTHER PUBLICATIONS

Bitcoinrelaynetwork.org [online], "The Bitcoin Relay Network," available no later than Jun. 28, 2015, retrieved on Aug. 24, 2021, retrieved from URL<bitcoinrelaynetwork.org/>, 3 pages.

Bloxroute.com [online], "BloxRoute," available on or before Dec. 2017, retrieved on Aug. 24, 2021, retrieved from URL<https://bloxroute.com/>, 8 pages.

Crosby et al., "BlockChain Technology: Beyond Bitcoin," Sutardja Center for Entrepreneurship & Technology Technical Report, Oct. 16, 2015, 35 pages.

falcon-net.org [online], "Falcon," available on or before Jun. 9, 2016, via Internet Archive: Wayback Machine URL<https://web.archive.org/web/20160609081540/https://www.falcon-net.org/>, retrieved on Aug. 24, 2021, URL<https://www.falcon-net.org/>, 4 pages.

Nakamoto, "Bitcoin: A Peer-to-Peer Electronic Cash System," www.bitcoin.org, 2005, 9 pages.

Ye et al., "BitXHub: Side-relay Chain Based Heterogeneous Blockchain Interoperable Platform," Computer Science, Jun. 2020, 47(6): 294-302 (with English abstract).

Charapko et al., "PigPaxos: Devouring the communication bottlenecks in distributed consensus," Proceedings of the 2021 International Conference on Management of Data, Mar. 17, 2020, 12 pages.

Extended European Search Report in European Application No. 21181391.0, dated Nov. 23, 2021, 13 pages.

Kaneko et al., "DHT Clustering for Load Balancing Considering Blockchain Data Size," 2018 Sixth International Symposium on Computing and Networking Workshops (CANDARW), Nov. 27, 2018, pp. 71-73.

* cited by examiner

Allocating, after receiving a blockchain message from any blockchain node, the blockchain message to a specific relay node in the any relay cluster, for the specific relay node to determine a target relay cluster based on identification information included in the blockchain message, the target relay cluster is connected to a target blockchain node indicated by the blockchain message — 602

Transmitting, after receiving the blockchain message returned by the specific relay node, the target blockchain message to the target blockchain node through the target relay cluster — 604

FIG. 6

Determining, in a case of receiving a blockchain message sent by a load balancer in the any relay cluster, a target relay cluster according to identification information included in the blockchain message, the target relay cluster is connected to a target blockchain node indicated by the blockchain message — 702

Transmitting the target blockchain message to the target blockchain node through the target relay cluster — 704

FIG. 7

BLOCKCHAIN SYSTEMS, AND MESSAGE TRANSMISSION METHODS AND APPARATUSES

CROSS-REFERENCE TO RELATED APPLICATIONS

This application claims priority to Chinese Patent Application No. 202011019900.2, filed on Sep. 25, 2020, which is hereby incorporated by reference in its entirety.

TECHNICAL FIELD

One or more embodiments of this specification relate to the field of blockchain technologies, and in particular, to blockchain systems, and message transmission methods and apparatuses.

BACKGROUND

The blockchain technology (also referred to as the distributed ledger technology) is a decentralized distributed database technology, featured by being decentralized, open, transparent, immutable, trustworthy, and the like, and is suitable for many application scenarios with high demands on data reliability.

SUMMARY

In view of this, one or more embodiments of this specification provide blockchain systems, and message transmission methods and apparatuses.

To achieve the previously described objective, one or more embodiments of this specification provide the following technical solutions:

According to a first aspect of the one or more embodiments of this specification, a blockchain system is provided, including: a blockchain relay communication network, wherein the blockchain relay communication network includes at least one relay cluster, each blockchain node is connected to at least one relay cluster, and each relay cluster includes a load balancer and at least one relay node connected to the load balancer;

the load balancer in any relay cluster is configured to, after receiving a blockchain message from any blockchain node, allocate the blockchain message to a specific relay node in the any relay cluster; and the specific relay node is configured to determine a target relay cluster according to identification information included in the blockchain message, the target relay cluster is connected to a target blockchain node indicated by the blockchain message, and transmit the target blockchain message to the target blockchain node through the target relay cluster.

According to a second aspect of the one or more embodiments of this specification, a message transmission method is provided, applicable to a load balancer belonging to any relay cluster in a blockchain relay communication network, the blockchain relay communication network including at least one relay cluster, each blockchain node is connected to at least one relay cluster, each relay cluster including a load balancer and at least one relay node connected to the load balancer, and the method including:

allocating, after receiving a blockchain message from any blockchain node, the blockchain message to a specific relay node in the any relay cluster, for the specific relay node to determine a target relay cluster according to identification information included in the blockchain message, the target relay cluster is connected to a target blockchain node indicated by the blockchain message; and transmitting, after receiving the blockchain message returned by the specific relay node, the target blockchain message to the target blockchain node through the target relay cluster.

According to a third aspect of the one or more embodiments of this specification, a message transmission method is provided, applicable to a specific relay node belonging to any relay cluster in a blockchain relay communication network, the blockchain relay communication network including at least one relay cluster, each blockchain node is connected to at least one relay cluster, each relay cluster including a load balancer and at least one relay node connected to the load balancer, and the method including:

determining, in a case of receiving a blockchain message sent by a load balancer in the any relay cluster, a target relay cluster according to identification information included in the blockchain message, the target relay cluster is connected to a target blockchain node indicated by the blockchain message; and transmitting the target blockchain message to the target blockchain node through the target relay cluster.

According to a fourth aspect of the one or more embodiments of this specification, a message transmission apparatus is provided, comprising:

a load balancer belonging to any relay cluster applicable to a blockchain relay communication network, the blockchain relay communication network including at least one relay cluster, each blockchain node is connected to at least one relay cluster, each relay cluster including a load balancer and at least one relay node connected to the load balancer, and the apparatus including:

a message allocation unit, configured to allocate, after receiving a blockchain message from any blockchain node, the blockchain message to a specific relay node in the any relay cluster, for the specific relay node to determine a target relay cluster according to identification information included in the blockchain message, the target relay cluster is connected to a target blockchain node indicated by the blockchain message; and a message transmission unit, configured to transmit, after receiving the blockchain message returned by the specific relay node, the target blockchain message to the target blockchain node through the target relay cluster.

According to a fifth aspect of the one or more embodiments of this specification, a message transmission apparatus is provided, comprising:

a specific relay node belonging to any relay cluster applicable to a blockchain relay communication network, the blockchain relay communication network including at least one relay cluster, each blockchain node is connected to at least one relay cluster, each relay cluster including a load balancer and at least one relay node connected to the load balancer, and the apparatus including:

a cluster determining unit, configured to determine, in a case of receiving a blockchain message sent by a load balancer in the any relay cluster, a target relay cluster according to identification information included in the blockchain message, the target relay cluster is connected to a target blockchain node indicated by the blockchain message; and a message transmission unit, configured to transmit the target blockchain message to the target blockchain node through the target relay cluster.

According to a sixth aspect of the one or more embodiments of this specification, an electronic device is provided, including:

a processor; and a memory configured to store instructions executable by the processor, the processor executing the executable instructions to implement the method according to the second aspect or the third aspect.

According to a seventh aspect of the one or more embodiments of this specification, a computer-readable storage medium is provided, the computer-readable storage medium stores computer instructions, the instructions implement the steps of the method according to the first aspect or the second aspect when executed by a processor.

BRIEF DESCRIPTION OF THE DRAWINGS

FIG. 6 is a flowchart of a message transmission method according to an explanatory embodiment.

FIG. 7 is a flowchart of another message transmission method according to an explanatory embodiment.

DETAILED DESCRIPTION OF EMBODIMENTS

Explanatory embodiments are described in detail herein, and examples of the explanatory embodiments are shown in the accompanying drawings. When the following description involves the accompanying drawings, unless otherwise indicated, the same numerals in different accompanying drawings represent the same or similar elements. The implementations described in the following explanatory embodiments are not all the implementations consistent with one or more embodiments of this specification, but are only examples of methods and apparatuses that are described in detail in the appended claims and that are consistent with some aspects of the one or more embodiments of this specification.

It should be noted that in other embodiments, the steps of corresponding methods are not necessarily performed according to sequences shown and described in this specification. In some other embodiments, the methods can include more or fewer steps than those described in this specification. In addition, a single step described in this specification can be divided into a plurality of steps for description in other embodiments, and a plurality of steps described in this specification can be combined into a single step for description in other embodiments.

Figure 1:
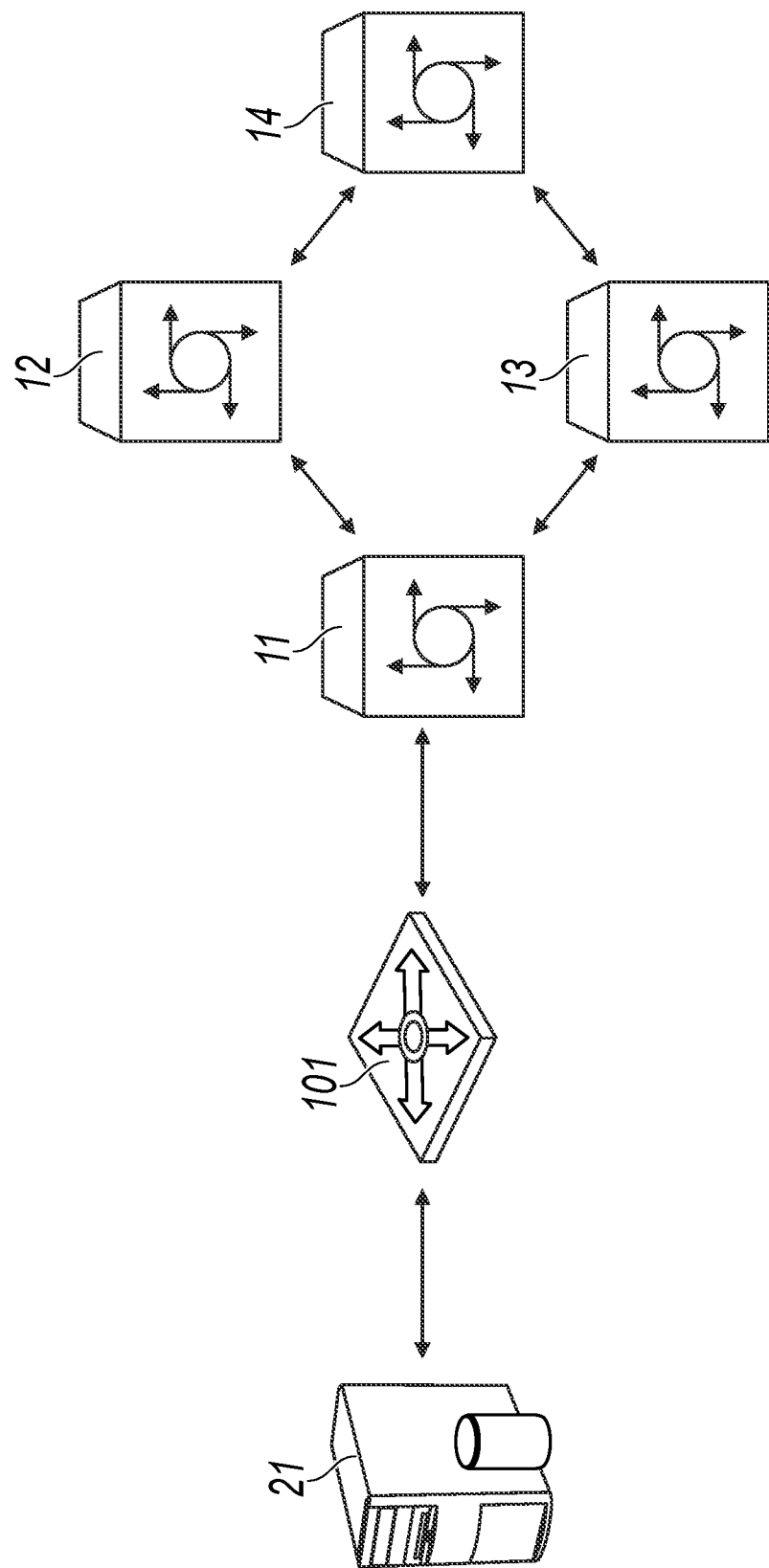
FIG. 1 is a schematic diagram showing interaction between a blockchain node and a blockchain relay communication network according to an explanatory embodiment.

FIG. 1 is a schematic diagram showing interaction between a blockchain node and a blockchain relay communication network according to an explanatory embodiment. As shown in FIG. 1, assume that a blockchain relay communication network includes a plurality of relay nodes such as a relay 11, a relay 12, a relay 13, and a relay 14. Taking the relay 11 as an example, the relay 11 can be connected to a node 21 in a blockchain network by using a gateway 101. Similarly, other relay nodes can also be connected to other blockchain nodes in the blockchain network. The gateway 101 is configured to assist the node 21 to access the blockchain relay communication network. The gateway 101 is logically equivalent to a blockchain node in the blockchain network, but the gateway 101 does not participate in blockchain consensus. In this way, the node 21 can communicate with the gateway 101 by using a communication protocol adopted by the blockchain network, and the gateway 101 does not have a negative impact on processes such as the consensus process in the blockchain network. The gateway 101 is substantially an adaptation program for the node 21 to access the blockchain relay communication network. The adaptation program can be deployed on the node 21, the relay 11, or other devices independent of the relay 11 and the node 21, which is not limited in this specification.

The blockchain network includes a plurality of blockchain nodes, and communication operations such as consensus, transaction transmission, and block synchronization need to be implemented between the blockchain nodes. In the related art, a peer-to-peer (P2P) technology is directly used for communication between the blockchain nodes to transmit transactions, blocks, or the like, but due to various network factors, a communication delay is long and stability is poor, which cannot satisfy application needs. Therefore, similar to the node 21, each blockchain node can access a relay node in the blockchain relay communication network respectively. In this way, the blockchain nodes can communicate with each other by using the blockchain relay communication network. The blockchain relay communication network is a backbone relay communication network for real-time transmission in blockchain, and the relay nodes can communicate and interact with each other by using high-quality bandwidth with a high QoS guarantee. Therefore, the blockchain relay communication network takes over intermediate links of communication between the blockchain nodes, which can reduce the communication delay and improve the stability, thereby significantly improving communication quality between the blockchain nodes.

The blockchain relay communication network can be applied to various types of blockchain networks, including a public blockchain, a private blockchain, a consortium blockchain, or the like. For example, the blockchain relay communication networks applicable to the public blockchains mainly include Falcon, Fast Bitcoin Relay Network (FBRN), Fast Internet Bitcoin Relay Engine (FIBRE), or the like, and the blockchain relay communication networks applicable to the consortium blockchains mainly include BloXRoute, Blockchain Transmission Network (BTN), or the like. However, the blockchain relay communication network in the related art can only function as a relay during communication between the blockchain nodes, and is not substantially different from the P2P transmission mechanism adopted when the blockchain relay communication network is not used.

Figure 2:
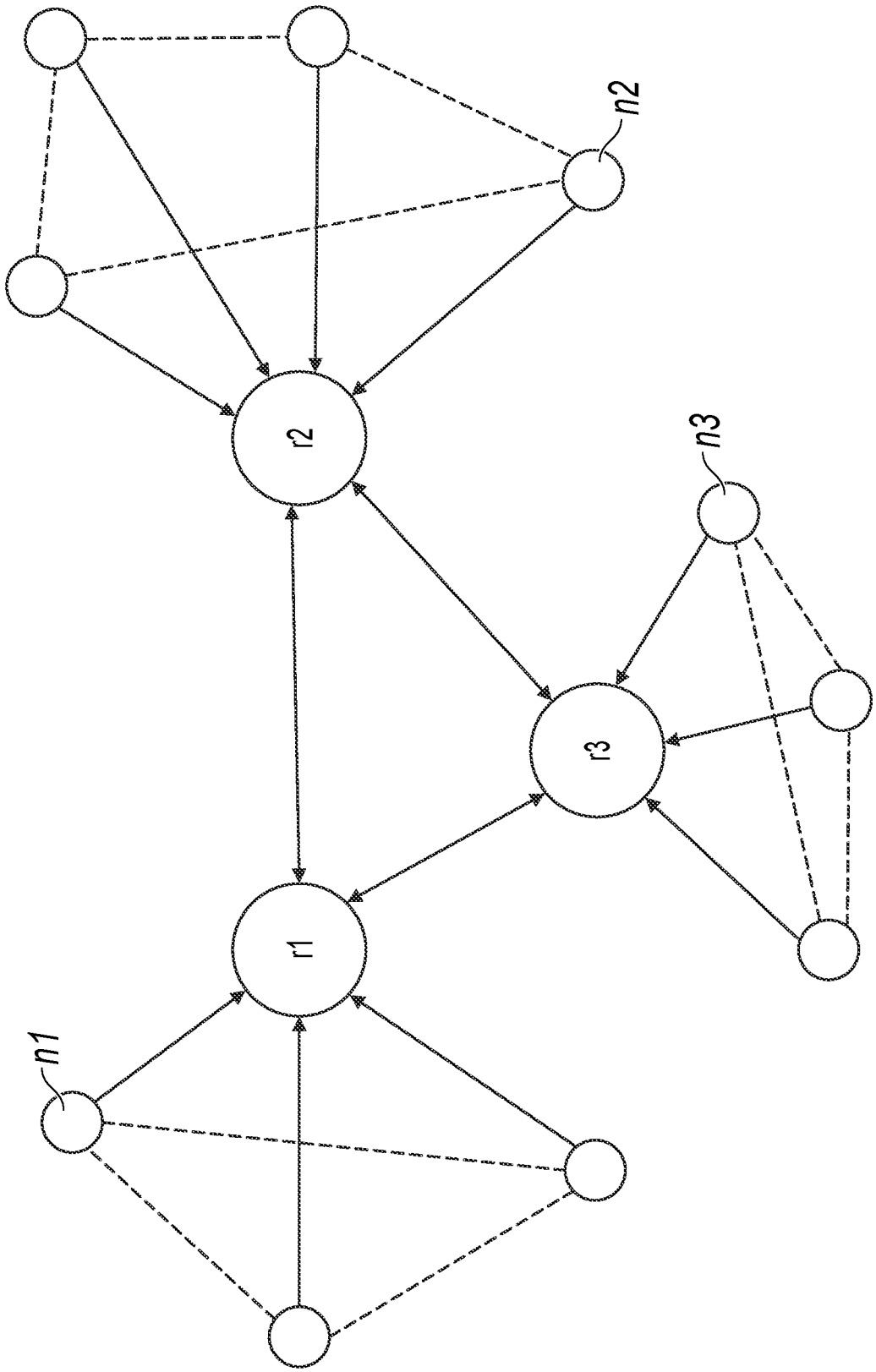
FIG. 2 is a schematic diagram of a message transmission scenario according to an explanatory embodiment.

Using a message transmission scenario shown in FIG. 2 as an example, blockchain nodes n1, n2, and n3 are respectively connected to relay nodes r1, r2, and r3 in a blockchain relay communication network. In this way, the blockchain node n1 can transmit a blockchain message to the blockchain node n2 through a path "n1→r1→r2→n2"; and similarly, the blockchain node n2 can transmit a blockchain message to the blockchain node n3 through a path "n2→r2→r3→n3". As can be seen, any blockchain node can implement message transmission with another blockchain node through corresponding relay nodes.

Actually, in this scenario, any blockchain node is only connected to one relay node. Using the blockchain node n1 as an example, because n1 is only connected to the relay node r1, for n1 and another blockchain node connected to r2, a blockchain message transmitted by n1 to the another blockchain node and a blockchain message sent by the another blockchain node to n1 all implement data transmission through the relay node r1. In other words, the relay node r1 is equivalent to an interface for implementing data interaction between the blockchain node n1 and the another blockchain node. Therefore, if the relay node r1 encounters a failure or even shuts down, the blockchain node n1 cannot implement message transmission with the another blockchain node, further resulting to unavailability of a blockchain service corresponding to the blockchain node n1, so that blockchain network operation stability in this scenario is relatively low.

To construct a blockchain network with higher operation stability in combination with the blockchain relay communication network, this specification provides a new blockchain system and a new message transmission solution based on the system, to use a relay cluster to replace a single relay node as a data transmission intermediary between blockchain nodes, and to ensure operation stability of a blockchain network through load balancing and reasonable scheduling.

Figure 3:
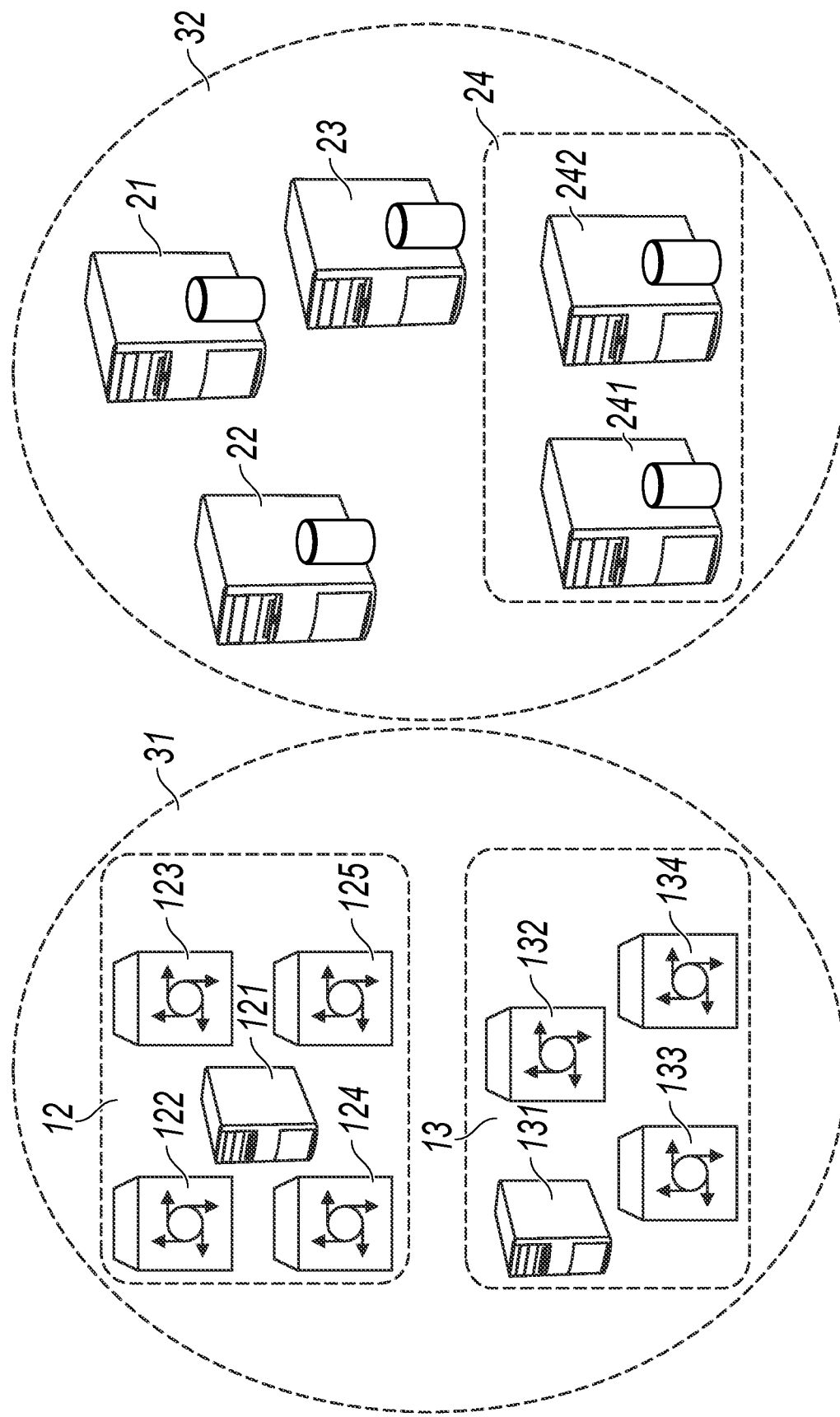
FIG. 3 is a schematic diagram of a blockchain system according to an explanatory embodiment.

FIG. 3 is a schematic diagram of a blockchain system according to an explanatory embodiment. As shown in FIG. 3, the blockchain system includes a blockchain relay communication network 31.

The blockchain relay communication network 31 includes at least one relay cluster (for example, a relay cluster 12 and a relay cluster 13), and each relay cluster includes a load balancer and at least one relay node (for example, the relay cluster 12 includes a load balancer 121 and relay nodes 122, 123, 124, and 125 that are connected to 121, and the relay cluster 13 includes a load balancer 131 and relay nodes 132, 133, and 134 that are connected to 131) connected to the load balancer. Each blockchain node is connected to at least one relay cluster (for example, a blockchain node 21 can be connected to the relay cluster 12, and a blockchain node 241 can be connected to the relay cluster 13), and the each blockchain node connected to the relay clusters can form a blockchain network 32. Certainly, a blockchain network 33, 34, or the like (not shown in the figure) can be alternatively formed, and details are not described herein again.

A load balancer (for example, the load balancer 121 in the relay cluster 12) in any relay cluster is configured to: after receiving a blockchain message from any blockchain node (for example, the blockchain node 21), allocate the blockchain message to a specific relay node in the relay cluster. Correspondingly, the specific relay node is configured to determine a target relay cluster (for example, the relay cluster 13) based on identification information included in the blockchain message, and transmit the target blockchain message to a target blockchain node through the target relay cluster, where the target relay cluster is connected to the target blockchain node (for example, a blockchain node 23) indicated by the blockchain message.

It should be noted that, for brevity of drawing, connecting lines corresponding to connection relationships that can exist between the relay nodes, between the relay nodes and the load balancer, between load balancers in different relay clusters, between the load balancer and the blockchain nodes in the same relay cluster, and between the blockchain nodes are omitted from FIG. 3.

In this embodiment, the blockchain nodes can be independent blockchain nodes as the blockchain nodes 21, 22, and 23 shown above. A plurality of blockchain nodes can alternatively form a blockchain node set, for example, the blockchain nodes 241 and 242 form a blockchain node set 24. Certainly, a quantity of blockchain nodes included in the blockchain network and included in the blockchain node set and connection relationships therebetween are not limited in this specification.

Figure 4:
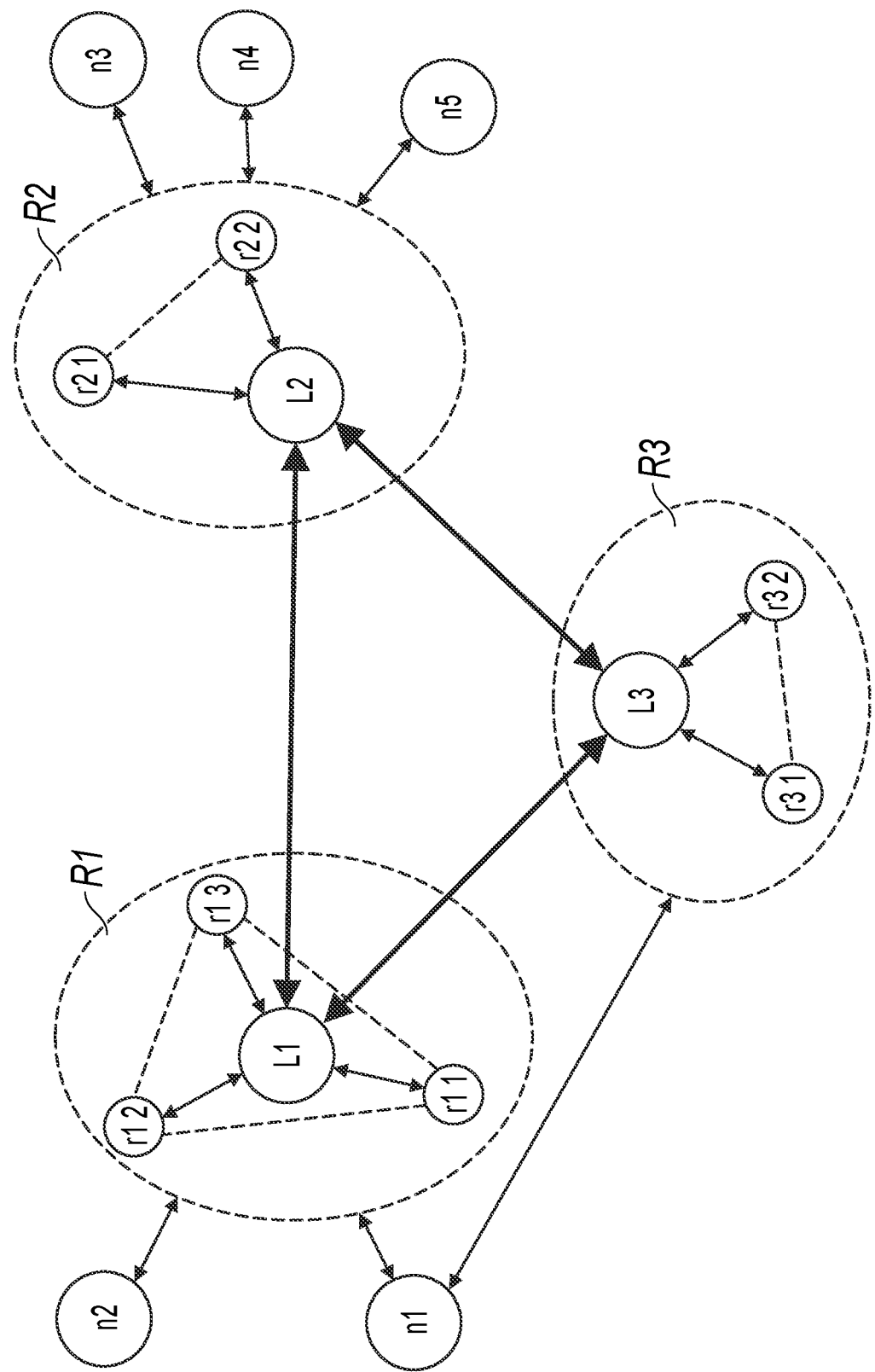
FIG. 4 is a schematic diagram of another blockchain system according to an explanatory embodiment.

To facilitate understanding of the technical solutions of this specification, with reference to FIG. 4, a process of transmitting a blockchain message based on the blockchain system shown in FIG. 3 is described by using an example in which a blockchain node n1 transmits a blockchain message to a blockchain node n5 through a relay cluster.

In this embodiment, system components such as relay clusters, relay nodes, and blockchain nodes in a system in FIG. 4 correspond to corresponding components in FIG. 3. For example, a relay cluster R1 in FIG. 4 can be the relay cluster 13 in FIG. 3; and correspondingly, a load balancer L1 in FIG. 4 can be the load balancer 131 in FIG. 3; relay nodes r11, r12, and r13 can be the relay nodes 132, 133, and 134 respectively; and the blockchain node n1 can be the blockchain node 241, which are not described one by one herein again. In addition, since relay nodes in the same relay cluster are all connected to a load balancer, that is, a load balancer in a relay cluster is configured to dispatch and control connections between the relay nodes and external blockchain nodes, and therefore, the load balancer in any relay cluster is equivalent to an entry/exit for data interaction between all relay nodes in the cluster and the external, and functions as an internal gateway of a local area network. For a blockchain node connected to a relay cluster, the cluster provides a unified cluster address (for example, an IP address of the load balancer), and relay nodes in the relay cluster communicate with each other by using respective internal addresses.

In an embodiment, the load balancer in any relay cluster can be an independent load balancer entity, or can be a centralized load balancer integrated in a primary relay node in the relay cluster in which the load balancer is located. For example, the load balancer can be a piece of code or a virtual component that is run in the primary relay node and used for implementing a function corresponding to the load balancer in the solutions of this specification. The primary relay node can be specified in advance, or can be elected by relay nodes in the relay cluster, to select a new primary relay node for replacement after the primary relay node fails or even shuts down, thereby ensuring non-stop operation of the load balancer, and further ensuring the stability of message transmission of the blockchain system.

In an embodiment, the blockchain node n1 can send a blockchain message including identification information to the relay cluster R1, where the identification information can be a node number, an IP address, a MAC address, and other node information of a target blockchain node (for example, the blockchain node n5) that can be used for uniquely representing the blockchain node. In this case, the message is the blockchain message sent by the blockchain node n1 to the blockchain node n5. Alternatively, the identification information can be a set of set reference numerals or set IDs of target blockchain nodes (for example, all blockchain nodes n4 and n5 included in a blockchain node set, where the set is not shown in the figure). In this case, the message is a blockchain message sent by the blockchain node n1 to all nodes (including the blockchain nodes n4 and n5) in the blockchain node set. The identification information included in the blockchain message is used for representing a blockchain node serving as a recipient of the blockchain message.

In an embodiment, before the blockchain message is sent to the relay cluster R1, the blockchain node n1 needs to establish a communication connection with a blockchain node in the relay cluster R1. In an explanatory embodiment, the communication connection can be a persistent connection that is pre-established and maintained between n1 and any relay node (for example, the relay node r11) in R1 before the blockchain message is received. Correspondingly, after n1 sends the blockchain message to r11 through the persistent connection, a heartbeat packet can be correspondingly sent and a reset time of the persistent connection is updated, to maintain the persistent connection. For example, n1 can send a heartbeat packet to the load balancer based on a predetermined cycle to maintain the persistent connection. n1 and r11 that are in a persistent connection state can directly send and receive blockchain messages from each other without temporarily establishing a transitory connection before a message is sent every time, thereby effectively improving sending and receiving efficiency of blockchain messages, and helping quickly complete quick transmission of blockchain messages.

In another explanatory embodiment, the communication connection can alternatively be a transitory connection that is temporarily established. In this case, the blockchain node n1 needs to establish the transitory connection with the relay node r11 before sending the blockchain message to the target blockchain node. For example, n1 can temporarily establish a TCP/IP transitory connection with r11 by using a mechanism related to "three-way handshake" in the related art, and send the blockchain message to r11 by using the established connection. Since the temporary connection is a transitory connection, after the blockchain message is sent, the connected parties do not need to maintain the connection, thereby effectively avoiding a waste of resources that can be caused by continued maintenance of the connection after the message is sent, which is particularly applicable to a scenario in which message transmission is not frequent.

Further, in a process that a communication connection is established between the blockchain node n1 and the relay node r11, if the communication connection is abnormal due to an abnormal state such as a failure or even shutdown of r11, n1 can attempt to connect again, that is, attempt to send a connection establishment request to the relay cluster R1 again. Correspondingly, the load balancer L1 in R1 can determine, after receiving the connection establishment request, an alternative relay node (for example, the relay node r12 or the relay node r13) different from r11 in R1, and establish a communication connection between n1 and the alternative relay node. The alternative relay node can be randomly selected from relay nodes that are different from r11, or a relay node of which a node address is closest to r11 in relay nodes that are different from r11 is determined as the alternative relay node. This is not limited in this specification. According to the previously described attempts, it can be ensured that in a case that a blockchain message cannot be transmitted since a relay node in a relay cluster fails or shuts down, another relay node in the relay cluster is used to continue to transmit the blockchain message, thereby continuing to provide a normal message transmission service for a blockchain node, and ensuring the operation stability of the load balancer and the blockchain system to some extent.

Furthermore, for any blockchain node, if all relay nodes in a relay cluster connected thereto are unavailable (failure or shutdown), or a load balancer in the relay cluster is unavailable, the relay cluster actually cannot provide a message transmission service for a corresponding blockchain node. In this case, the blockchain node can use a backup relay cluster connected thereto to implement message transmission. That is, in a case that connections established with all the relay nodes in the relay cluster connected thereto all fail, the blockchain node can determine a backup relay cluster corresponding to the relay cluster, and establish a connection with a relay node in the backup relay cluster to send a blockchain message. For example, in a case that the relay nodes r11, r12, and r13 in the relay cluster R1 all fail or shut down, any relay node in R1 cannot establish a communication connection with the blockchain node n1. In this case, n1 can attempt, in a case of perceiving that the connection is lost and cannot be established or receiving a cluster failure notification message sent by the load balancer L1, to establish a communication connection with a backup relay cluster R3 connected thereto, and use the communication connection established with R3 to transmit a blockchain message. Actually, any blockchain node can be connected to a plurality of relay clusters and correspondingly set a primary cluster and backup clusters, thereby implementing the cluster change to ensure normal and stable transmission of blockchain messages.

In this embodiment, after receiving the blockchain message sent by the blockchain node n1, the load balancer L1 can determine a corresponding specific relay node in a plurality of manners. In an explanatory embodiment, in a case that L1 maintains information about a persistent connection established between each blockchain node connected to the relay cluster R1 and each relay node included in R1, L1 can determine a relay node (for example, the relay node r13) that maintains a persistent connection with n1 in R1 as the specific relay node based on the maintained information about the persistent connection. In this case, a process that L1 determines a relay node corresponding to any blockchain node and establish a persistent connection between the relay node and the blockchain node is a process of performing load balancing on a blockchain message sent by the blockchain node, and a relay node that establishes a persistent connection relationship with the blockchain node can be determined based on a predetermined load balancing algorithm.

In another explanatory embodiment, the load balancer L1 can select a relay node from the relay cluster R1 as the specific relay node based on the predetermined load balancing algorithm. Specifically, the load balancing algorithm can be a round robin algorithm, a stochastic algorithm, or the like, to ensure that specific relay nodes corresponding to two adjacent blockchain messages are as different as possible, so as to prevent a specific relay node from receiving blockchain messages consecutively and frequently, thereby improving the transmission efficiency and stability of blockchain messages, and in particular, of a plurality of blockchain messages that are sent consecutively. Certainly, the specific relay node can alternatively be quickly determined in a manner of performing a modulo operation on a node address of the target blockchain node, and for details, reference can be made to the following embodiment.

After determining that the specific relay node is r13, the load balancer L1 can send a blockchain message to r13.

Correspondingly, r13 can parse the blockchain message to obtain identification information carried in the message, and determine a target relay cluster to which a target blockchain node serving as a recipient of the blockchain message is connected based on the identification information, thereby transmitting the blockchain message to the target blockchain node through the target relay cluster.

Specifically, the specific relay node r13 can maintain a routing policy of each blockchain node to which each relay node in the blockchain relay communication network is connected in advance. For example, address information of the each blockchain node in the blockchain network can be recorded in advance. Before a blockchain node is added to any blockchain node set, a routing policy that is corresponding to the blockchain node and that is in the blockchain relay communication network only involves a node ID of the blockchain node and a cluster ID of a relay cluster connected to the blockchain node. For example, a routing policy corresponding to the blockchain node n1 in FIG. 4 is "node n1-cluster R1", and a routing policy corresponding to the blockchain node n5 is "node n5-cluster R2", or the like. After a blockchain node is added to a blockchain node set, information related to the blockchain node set is added to a routing policy that is corresponding to the blockchain node and that is in the blockchain relay communication network. For example, when the blockchain node n5 is added to a blockchain node set SID2, the routing policy corresponding to the blockchain node n5 can be updated from the "node n5-cluster R2" to "SID2/node n5-cluster R2", indicating that the blockchain node n5 belongs to the blockchain node set SID2.

Figure 5:
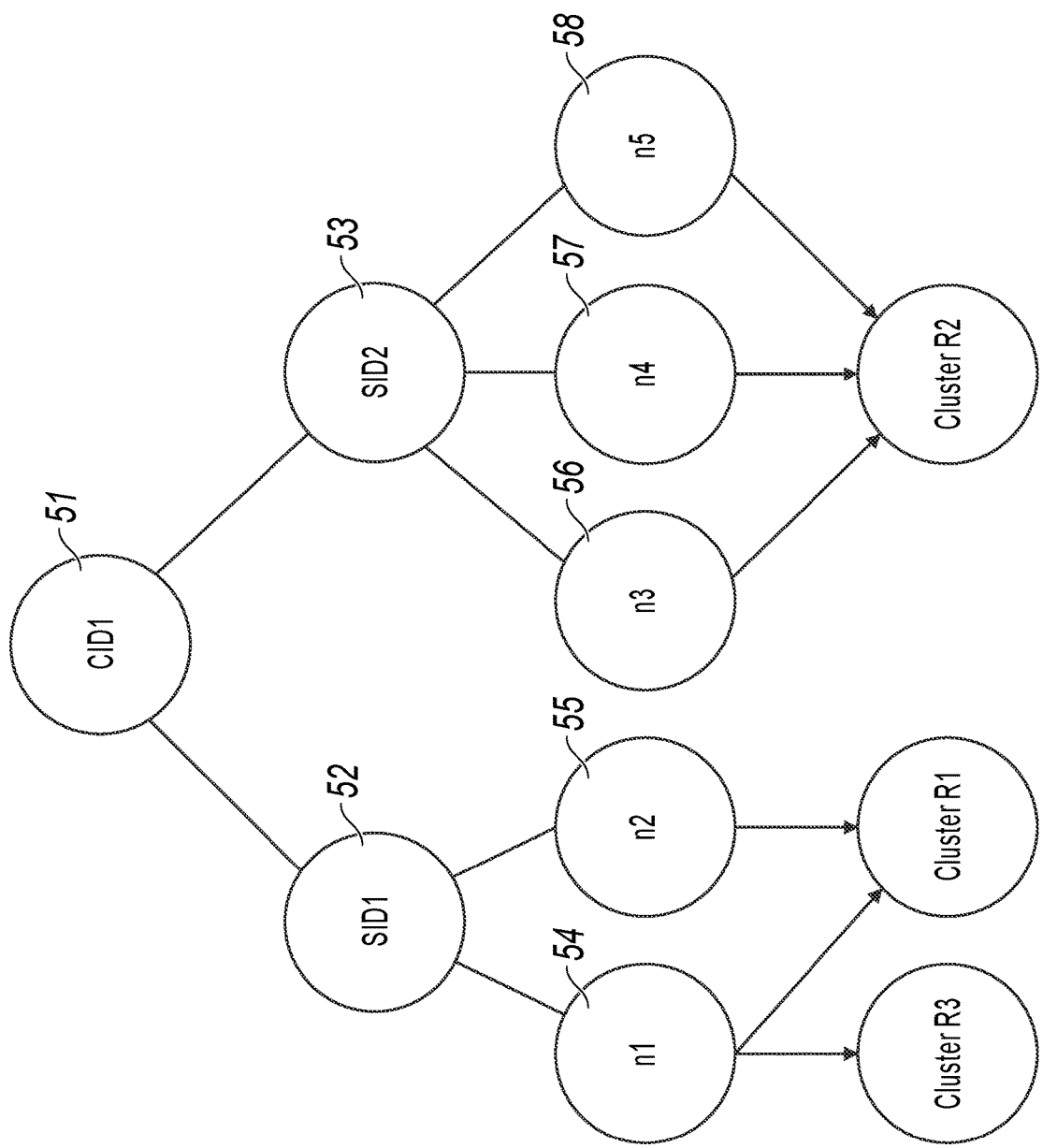
FIG. 5 is a schematic diagram of a tree-type routing table adding role types according to an explanatory embodiment.

There can be a hierarchical relationship between blockchain node sets. Based on the hierarchical relationship, the blockchain node sets to which the blockchain nodes belong, and the connection relationship between the blockchain nodes and the relay nodes, routing policies that are corresponding to the blockchain nodes and that are in the blockchain relay communication network can be formed into a tree-type structure, that is, a tree-type routing table. For example, as shown in FIG. 5, assume that blockchain nodes n1 and n2 both belong to a blockchain node set SID1, blockchain nodes n3, n4, and n5 all belong to a blockchain node set SID2, and SID1 and SID2 both belong to a blockchain node set CID1 (therefore, n1 to n5 actually all belong to the blockchain node set CID1). Therefore, CID1 corresponds to a root node 51 in this tree-type routing table, SID1 and SID2 respectively correspond to leaf nodes 52 and 53 of the root node 51 in this tree-type routing table, n1 and n2 respectively correspond to leaf nodes 54 and 55 of the node 52 in this tree-type routing table, n3 to n5 respectively correspond to leaf nodes 56 to 58 of the node 53 in this tree-type routing table, and the nodes 54 to 58 are leaf nodes of the tree-type routing table, and values of these leaf nodes are cluster IDs of relay clusters connected to these leaf nodes. For example, n1 is connected to R1 and R2 simultaneously, so that a value of the leaf node 54 is the cluster R1 or the cluster R2, and the blockchain node n5 is connected to R2, so that a value of the leaf node 58 is the cluster R2, and the like.

Certainly, the tree-type routing table shown in FIG. 5 shows routing relationships in a logical level, and the relay node usually adopts other forms when actually recording the routing relationships. For example, for each blockchain node, the relay node can generate, according to a path from the root node to a leaf node corresponding to the blockchain node, a routing policy corresponding to the blockchain node, and separate adjacent nodes by using a predetermined separator. In this way, a routing policy corresponding to the blockchain node n1 can be CID1/SID1/Node1:R1orR2, where Node1 is a node ID of n1, and R1 is a relay ID of the relay cluster R1. Similarly, a routing policy corresponding to n5 can be CID1/SID2/Node5:R2, where Node5 is a node ID of n5, and R2 is a relay ID of the relay cluster R2, or the like.

By describing the nodes on the whole path where the blockchain node is located in the routing policy, a set identifier of a low-hierarchy blockchain node set can be more flexible. For example, based on the blockchain node sets SID1 and SID2, a next hierarchy of blockchain node sets are further included, such as a blockchain node set 1 belonging to the blockchain node set SID1 and a blockchain node set 2 belonging to the blockchain node set SID2, so even if the blockchain node set 1 and the blockchain node set 2 adopt the same set identifier, the two sets can also be distinguished by a difference between the blockchain node sets SID1 and SID2.

The same blockchain node can be added to one or more blockchain node sets according to application needs. That is, blockchain nodes included in different blockchain node sets can overlap. For example, a blockchain node set C1 can include n1 and n2, and a blockchain node set C2 can include n2, n3, n4, and n5, so that n2 belongs to the two blockchain node sets C1 and C2 at the same time.

The specific relay node r13 can determine a relay cluster to which the target blockchain node is connected by querying the routing policy. For example, if a target node address corresponding to the received blockchain message is CID1/SID2/Node5:R2, it can be determined that the target blockchain node is the blockchain node n5, and the target relay cluster is R2; and if a target node address corresponding to the received blockchain message is CID1/SID2, it can be determined that the target relay cluster is R2, and the target blockchain node refers to all blockchain nodes connected to R2.

Actually, the target relay cluster determined through the previously described process can be another cluster different from the any relay cluster, or can be the any relay cluster itself. Correspondingly, in a case that the target relay cluster is different from the any relay cluster, the specific relay node can transmit the blockchain message to the target relay cluster, for the target relay cluster to forward the blockchain message to the target blockchain node; or in a case that the target relay cluster is the any relay cluster, the specific relay node can determine a target relay node that is connected to the target blockchain node and that is in the any relay cluster, for the target relay node to forward the blockchain message to the target blockchain node. For example, in a case of determining that the target relay cluster is the relay cluster R2, the specific relay node r13 can send the blockchain message to R2, for R2 to determine a corresponding target blockchain node n5 and transmit the blockchain message to n5; and in a case of determining that the target relay cluster is the relay cluster R1, r13 can further determine a corresponding target blockchain node n2, and then determine a relay node r12 that maintains a communication connection with n2 as the target relay node, to further send the blockchain message to r12 and cause r12 to transmit the blockchain message to n2.

According to the previous embodiments, in the blockchain system provided in this solution, any blockchain node in a blockchain network is connected to at least one relay cluster in a blockchain relay communication network, so that a relay cluster is used as a data transmission relay intermediary between blockchain nodes, thereby improving operation stability of the blockchain network and the any blockchain node to some extent through load balancing and reasonable scheduling.

Based on the blockchain system embodiments of the present disclosure, the present disclosure further provides a message transmission method. As shown in FIG. 6, the method is applicable to a load balancer belonging to any relay cluster in a blockchain relay communication network, the blockchain relay communication network including at least one relay cluster, each blockchain node is connected to at least one relay cluster, each relay cluster including a load balancer and at least one relay node connected to the load balancer. The method can include the following steps:

Step 602: Allocating, after receiving a blockchain message from any blockchain node, the blockchain message to a specific relay node in the any relay cluster, for the specific relay node to determine a target relay cluster based on identification information included in the blockchain message, the target relay cluster is connected to a target blockchain node indicated by the blockchain message.

In an embodiment, the load balancer can determine the specific relay node in a plurality of methods. In an explanatory embodiment, the load balancer can select a relay node from any relay cluster in which the load balancer is located as the specific relay node through a predetermined load balancing algorithm. Specifically, this method can be implemented by using the round robin algorithm, the stochastic algorithm, or the like, to ensure that specific relay nodes corresponding to two adjacent blockchain messages are as different as possible, so as to prevent a relay node (serving as a specific relay node) from receiving blockchain messages consecutively and frequently, thereby improving the transmission efficiency and stability of blockchain messages, and in particular, of a plurality of blockchain messages that are sent consecutively. Alternatively, to accelerate a node determining speed to further improve a transmission speed of a blockchain message, the specific relay node can be alternatively determined by using an address modulo algorithm. This is not limited in this specification.

In another explanatory embodiment, in a case that the load balancer maintains information about a persistent connection established between each blockchain node connected to the any relay cluster and each relay node included in the any relay cluster, the load balancer can determine a relay node that is in the any relay cluster and that maintains a persistent connection with the any blockchain node as the specific relay node based on the maintained information about the persistent connections. In this case, the load balancer can determine the relay node that has maintained a persistent connection with the any blockchain node in a method of querying the information about the persistent connections and use the relay node as the specific relay node, thereby ensuring that the specific relay node has necessarily established and maintained a persistent connection with the any blockchain node, and further ensuring the reliability of transmission of subsequent blockchain messages.

In an embodiment, the load balancer can determine, in response to a connection establishment request sent by the any blockchain node in a case that a communication connection is abnormal, an alternative relay node different from the specific relay node in the any relay cluster, and establish a communication connection between the any blockchain node and the alternative relay node, to implement failure evasion and load balancing on the relay node.

Step 604: Transmitting, after receiving the blockchain message returned by the specific relay node, the target blockchain message to the target blockchain node through the target relay cluster.

In an embodiment, the load balancer can establish a communication connection between the any blockchain node and the specific relay node, and receive the blockchain message sent by the specific blockchain node through the communication connection, and then transmit the blockchain message to a target relay node or the target blockchain node. Further, the load balancer can select a specific relay node from any relay cluster based on a predetermined load balancing algorithm. For a specific method, reference can be made to records of the previously described embodiment, and details are not described herein again.

For a specific implementation process of this method, reference can be made to detailed records of the embodiment shown in FIG. 3, and details are not described herein again.

Based on the blockchain system embodiment of the present disclosure, the present disclosure further provides a message transmission method. As shown in FIG. 7, the method is applicable to a specific relay node belonging to any relay cluster in a blockchain relay communication network, the blockchain relay communication network includes at least one relay cluster, each blockchain node is connected to at least one relay cluster, each relay cluster includes a load balancer and at least one relay node connected to the load balancer. The method can include the following steps:

Step 702: Determining, in a case of receiving a blockchain message sent by a load balancer in the any relay cluster, a target relay cluster according to identification information included in the blockchain message, the target relay cluster is connected to a target blockchain node indicated by the blockchain message.

Step 704: Transmitting the target blockchain message to the target blockchain node through the target relay cluster.

In an embodiment, the target relay cluster determined through the previously described process can be another cluster different from the any relay cluster, or can be the any relay cluster itself. Correspondingly, in a case that the target relay cluster is different from the any relay cluster, the specific relay node can transmit the blockchain message to the target relay cluster, for the target relay cluster to forward the blockchain message to the target blockchain node; or in a case that the target relay cluster is the any relay cluster, the specific relay node can determine a target relay node that is connected to the target blockchain node and that is in the any relay cluster, for the target relay node to forward the blockchain message to the target blockchain node.

For a specific implementation process of this method, reference can be made to detailed records of the embodiment shown in FIG. 3, and details are not described herein again.

Figure 8:
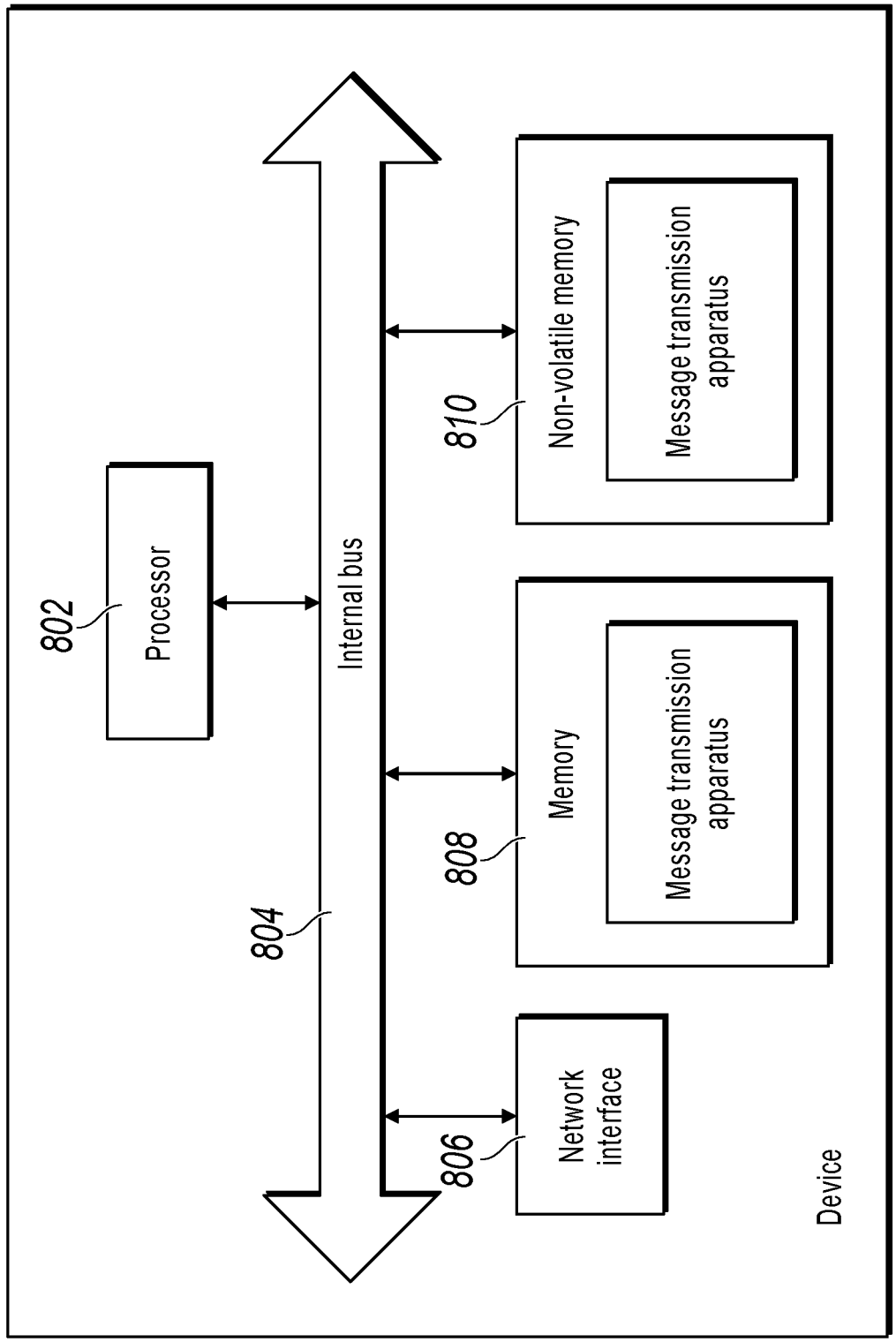
FIG. 8 is a schematic structural diagram of a device according to an explanatory embodiment.

FIG. 8 is a schematic structural diagram of a device according to an explanatory embodiment. Referring to FIG. 8, at a hardware level, the device includes a processor 802, an internal bus 804, a network interface 806, memory 808, and a non-volatile memory 810, and certainly can further include hardware needed for other services. The processor 802 reads a corresponding computer program from the non-volatile memory 810 into the memory 808 and then runs the computer program, to form a message transmission apparatus at a logic level. Certainly, in addition to a software implementation, one or more embodiments of this specification do not exclude other implementations, for example, logic devices or a software-hardware combination. That is, entities performing the following processing procedures are not limited to logic units and can alternatively be hardware or logic devices.

Figure 9:
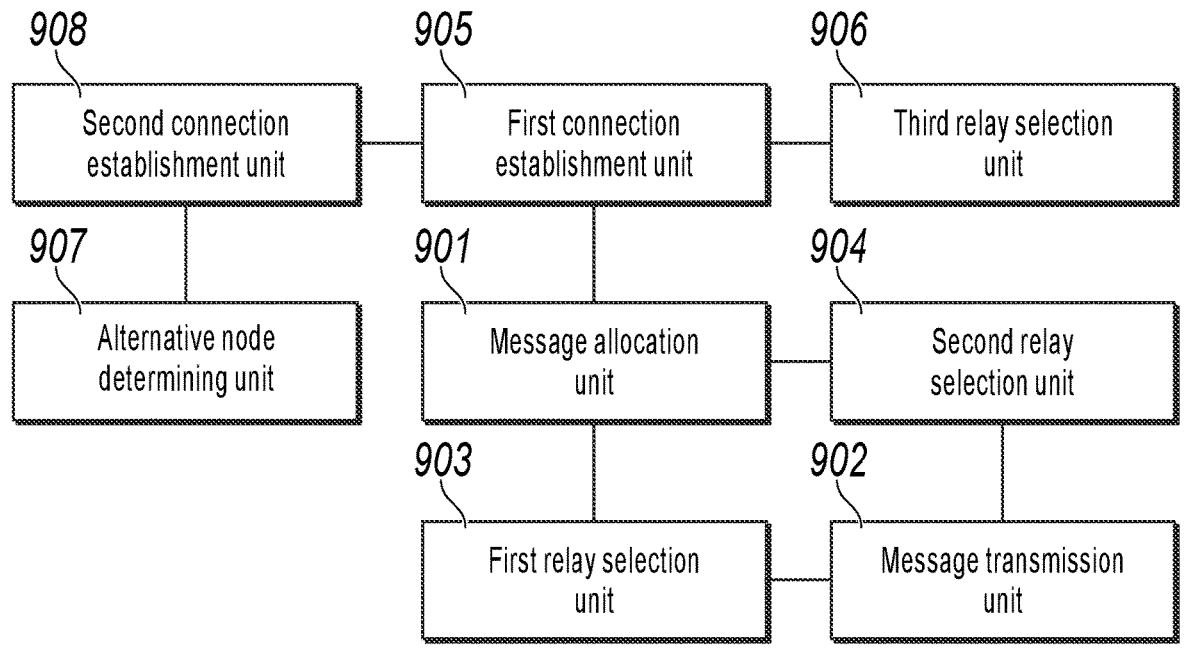
FIG. 9 is a block diagram of a message transmission apparatus according to an explanatory embodiment.

Referring to FIG. 9, in a software implementation, the message transmission apparatus is applicable to a load balancer belonging to any relay cluster in a blockchain relay communication network, the blockchain relay communication network includes at least one relay cluster, each blockchain node is connected to at least one relay cluster, each relay cluster includes a load balancer and at least one relay node connected to the load balancer. The apparatus can include:

a message allocation unit 901, configured to allocate, after receiving a blockchain message from any blockchain node, the blockchain message to a specific relay node in the any relay cluster, for the specific relay node to determine a target relay cluster based on identification information included in the blockchain message, the target relay cluster is connected to a target blockchain node indicated by the blockchain message; and a message transmission unit 902, configured to transmit, after receiving the blockchain message returned by the specific relay node, the target blockchain message to the target blockchain node through the target relay cluster.

Optionally, the apparatus further includes:

a first relay selection unit 903, configured to select a relay node from the any relay cluster as the specific relay node according to a predetermined load balancing algorithm; or a second relay selection unit 904, configured to determine, in a case that the load balancer maintains information about a persistent connection established between each blockchain node connected to the any relay cluster and each relay node included in the any relay cluster, a relay node in the any relay cluster that maintains a persistent connection with the any blockchain node as the specific relay node based on the maintained information about the persistent connections.

Optionally, the apparatus further includes:

a first connection establishment unit 905, configured to establish a communication connection between the any blockchain node and any relay node in the any relay cluster, and receive the blockchain message sent by the any blockchain node through the communication connection.

Optionally, the apparatus further includes:

a third relay selection unit 906, configured to select the any relay node from the any relay cluster according to a predetermined load balancing algorithm.

Optionally, the apparatus further includes:

an alternative node determining unit 907, configured to determine an alternative relay node different from the any relay node in the any relay cluster in response to a connection establishment request sent by the any blockchain node in a case that the communication connection is abnormal; and a second connection establishment unit 908, configured to establish a communication connection between the any blockchain node and the alternative relay node.

Figure 10:
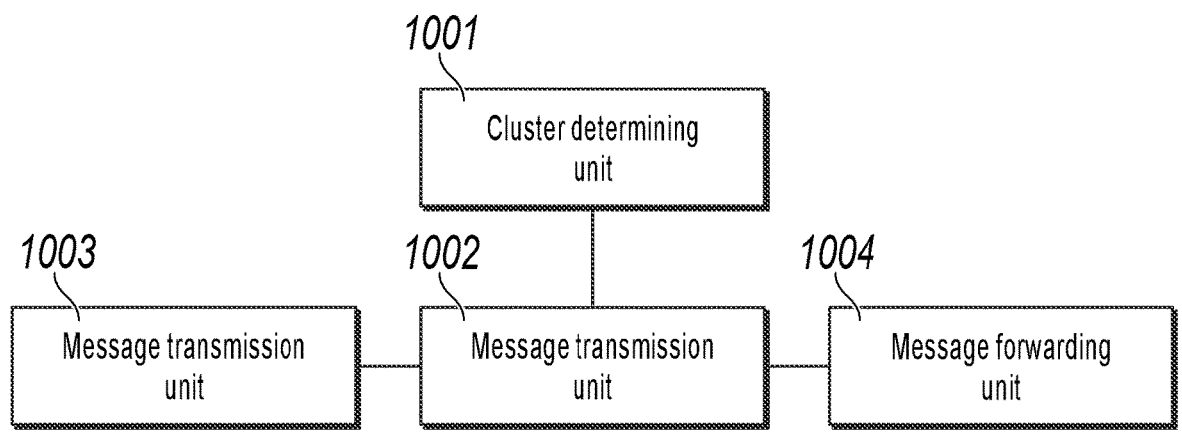
FIG. 10 is a block diagram of another message transmission apparatus according to an explanatory embodiment.

Referring to FIG. 10, in a software implementation, the message transmission apparatus is applicable to a specific relay node belonging to any relay cluster in a blockchain relay communication network, the blockchain relay communication network includes at least one relay cluster, each blockchain node is connected to at least one relay cluster, each relay cluster includes a load balancer and at least one relay node connected to the load balancer. The apparatus can include:

a cluster determining unit 1001, configured to determine, in a case of receiving a blockchain message sent by a load balancer in the any relay cluster, a target relay cluster based on identification information included in the blockchain message, the target relay cluster is connected to a target blockchain node indicated by the blockchain message; and a message transmission unit 1002, configured to transmit the target blockchain message to the target blockchain node through the target relay cluster.

Optionally, the apparatus further includes:

a message transmission unit 1003, configured to: in a case that the target relay cluster is different from the any relay cluster, transmit the blockchain message to the target relay cluster, for the target relay cluster to forward the blockchain message to the target blockchain node; and a message forwarding unit 1004, configured to: in a case that the target relay cluster is the any relay cluster, determine a target relay node that is connected to the target blockchain node and that is in the any relay cluster, for the target relay node to forward the blockchain message to the target blockchain node.

The system, the apparatus, the modules, or the units described in the previously described embodiments can be specifically implemented by a computer chip or an entity, or implemented by a product having a certain function. A typical implementation device is a computer. A specific form of the computer can be a personal computer, a laptop computer, a cellular phone, a camera phone, a smartphone, a personal digital assistant, a media player, a navigation device, an email transceiver device, a game console, a tablet computer, a wearable device, or a combination of any of these devices.

In a typical configuration, the computer includes one or more processors (such as CPUs), one or more input/output interfaces, one or more network interfaces, and one or more memories.

The memory can include a form such as a volatile memory, a random access memory (RAM) and/or a non-volatile memory such as a read-only memory (ROM) or a flash RAM in a computer-readable medium. The memory is an example of the computer-readable medium.

The computer-readable medium includes a persistent medium and a non-persistent medium, a removable medium and a non-removable medium, which can implement storage of information by using any method or technology. The information can be computer-readable instructions, a data structure, a module of a program, or other data. Examples of a storage medium of a computer include, but are not limited to, a phase-change memory (PRAM), a static RAM (SRAM), a dynamic RAM (DRAM), a RAM of another type, a ROM, an electrically erasable programmable ROM (EEPROM), a flash memory or another memory technology, a compact disc ROM (CD-ROM), a digital versatile disc (DVD) or another optical storage device, a cassette tape, a magnetic disk storage, a quantum memory, a graphene-based storage medium or another magnetic storage device, or any other non-transmission medium, which can be configured to store information accessible by a computing device. According to limitations of this specification, the computer-readable medium does not include transitory computer-readable media, such as a modulated data signal and a modulated carrier.

It should be further noted that the terms "include", "comprise", or any variants thereof are intended to cover a non-exclusive inclusion. Therefore, a process, method, product, or device that includes a series of elements not only includes such elements, but also includes other elements not specified expressly, or can include inherent elements of the process, method, product, or device. Without further limitation, the element defined by a phrase "include a/an . . . " does not exclude other same elements in the process, method, product, or device which include the element.

Specific embodiments of this specification are described above. Other embodiments fall within the scope of the appended claims. In some cases, the actions or steps recorded in the claims can be performed in sequences different from those in the embodiments and an expected result can still be achieved. In addition, the processes depicted in the accompanying drawings is not necessarily performed in the specific order or successively to achieve an expected result. In some implementations, multitasking and parallel processing can be feasible or beneficial.

The terms used in one or more embodiments of this specification are merely used to describe the embodiments but are not intended to limit one or more embodiments of this specification. The "a" and "the" in a singular form used in one or more embodiments of this specification and the appended claims are also intended to include a plural form, unless other meanings are clearly indicated in the context. It should be further understood that the term "and/or" used herein indicates and includes any or all possible combinations of one or more associated listed items.

It should be understood that although the terms "first", "second", "third", and the like can be used to describe various information in one or more embodiments of this specification, such information should not be limited to these terms. These terms are merely used to distinguish between information of the same type. For example, without departing from the scope of one or more embodiments of this specification, first information can also be referred to as second information. Similarly, second information can also be referred to as first information. Depending on the context, for example, the word "if" used herein can be interpreted as "while" or "when", or "in response to determination".

The previous descriptions are merely explanatory embodiments of one or more embodiments of this specification, but are not intended to limit the one or more embodiments of this specification. Any modification, equivalent replacement, or improvement made within the spirit and principle of one or more embodiments of this specification shall fall within the protection scope of the one or more embodiments of this specification.

What is claimed is:

1. A computer-implemented method, comprising:
receiving a blockchain message from a blockchain node of a plurality of blockchain nodes in a blockchain relay communication network;
sending, the blockchain message to a relay node in a relay cluster of a plurality of relay clusters, wherein the relay node determines a target relay cluster of the plurality of relay clusters according to identification information included in the blockchain message, wherein the target relay cluster is connected to a target blockchain node in the blockchain relay communication network indicated by the blockchain message; and
transmitting, by the relay node, the blockchain message to the target blockchain node through the target relay cluster, wherein each blockchain node of the plurality of blockchain nodes is connected to at least one relay cluster of the plurality of relay clusters, and wherein each relay cluster of the plurality of relay clusters comprises a load balancer and at least one relay node connected to the load balancer.

2. The computer-implemented method according to claim 1, comprising:
selecting the relay node from the plurality of relay clusters according to a predetermined load balancing algorithm.

3. The computer-implemented method according to claim 1, wherein the load balancer maintains information about a persistent connection established between each blockchain node connected to the at least one relay cluster and each relay node of a plurality of relay nodes included in the relay cluster.

4. The computer-implemented method according to claim 3, comprising:
determining that the relay node in the relay cluster maintains a persistent connection with the blockchain node according to information maintained by the load balancer about the persistent connection.

5. The computer-implemented method according to claim 1, comprising:
establishing a communication channel between the blockchain node and the relay node in the relay cluster; and
receiving the blockchain message from the blockchain node through the communication channel.

6. The computer-implemented method according to claim 5, comprising:
detecting a communication failure of the communication channel; and
determining, an alternative relay node different from the relay node in the relay cluster in response to a connection establishment request sent by the blockchain node.

7. The computer-implemented method according to claim 6, comprising:
establishing an alternative communication connection between the blockchain node and the alternative relay node.

8. The computer-implemented method according to claim 1, comprising:
selecting the relay node from the relay cluster according to a predetermined load balancing algorithm.

9. A non-transitory, computer-readable medium storing one or more instructions executable by a computer system to perform operations comprising:
receiving a blockchain message from a blockchain node of a plurality of blockchain nodes in a blockchain relay communication network;
sending, the blockchain message to a relay node in a relay cluster of a plurality of relay clusters, wherein the relay node determines a target relay cluster of the plurality of relay clusters according to identification information included in the blockchain message, wherein the target relay cluster is connected to a target blockchain node in the blockchain relay communication network indicated by the blockchain message; and
transmitting, by the relay node, the blockchain message to the target blockchain node through the target relay cluster, wherein each blockchain node of the plurality of blockchain nodes is connected to at least one relay cluster of the plurality of relay clusters, and wherein each relay cluster of the plurality of relay clusters comprises a load balancer and at least one relay node connected to the load balancer.

10. The non-transitory, computer-readable medium according to claim 9, comprising operations of:
selecting the relay node from the plurality of relay clusters according to a predetermined load balancing algorithm.

11. The non-transitory, computer-readable medium according to claim 9, wherein the load balancer maintains information about a persistent connection established between each blockchain node connected to the at least one relay cluster and each relay node of a plurality of relay nodes included in the relay cluster.

12. The non-transitory, computer-readable medium according to claim 11, comprising operations of:
   determining that the relay node in the relay cluster maintains a persistent connection with the blockchain node according to information maintained by the load balancer about the persistent connection.

13. The non-transitory, computer-readable medium according to claim 9, comprising operations of:
   establishing a communication channel between the blockchain node and the relay node in the relay cluster; and
   receiving the blockchain message from the blockchain node through the communication channel.

14. The non-transitory, computer-readable medium according to claim 13, comprising operations of:
   detecting a communication failure of the communication channel;
   determining, an alternative relay node different from the relay node in the relay cluster in response to a connection establishment request sent by the blockchain node; and
   establishing an alternative communication connection between the blockchain node and the alternative relay node.

15. The non-transitory, computer-readable medium according to claim 9, comprising operations of:
   selecting the relay node from the relay cluster according to a predetermined load balancing algorithm.

16. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      receiving a blockchain message from a blockchain node of a plurality of blockchain nodes in a blockchain relay communication network;
      sending, the blockchain message to a relay node in a relay cluster of a plurality of relay clusters, wherein the relay node determines a target relay cluster of the plurality of relay clusters according to identification information included in the blockchain message, wherein the target relay cluster is connected to a target blockchain node in the blockchain relay communication network indicated by the blockchain message; and
      transmitting, by the relay node, the blockchain message to the target blockchain node through the target relay cluster, wherein each blockchain node of the plurality of blockchain nodes is connected to at least one relay cluster of the plurality of relay clusters, and wherein each relay cluster of the plurality of relay clusters comprises a load balancer and at least one relay node connected to the load balancer.

17. The computer-implemented system according to claim 16,
   selecting the relay node from the plurality of relay clusters according to a predetermined load balancing algorithm.

18. The computer-implemented system according to claim 16, wherein the load balancer maintains information about a persistent connection established between each blockchain node connected to the at least one relay cluster and each relay node of a plurality of relay nodes included in the relay cluster.

19. The computer-implemented system according to claim 18, comprising one or more operations of:
   determining that the relay node in the relay cluster maintains a persistent connection with the blockchain node according to information maintained by the load balancer about the persistent connection.

20. The computer-implemented system according to claim 16, comprising one or more operations of:
   establishing a communication channel between the blockchain node and the relay node in the relay cluster;
   receiving the blockchain message from the blockchain node through the communication channel;
   detecting a communication failure of the communication channel; and
   determining, an alternative relay node different from the relay node in the relay cluster in response to a connection establishment request sent by the blockchain node.

* * * * *